Aug. 26, 1930.  F. J ENGLEN  1,774,362
MACHINE FOR WASHING MEAT TROLLEYS
Filed June 28, 1928  3 Sheets-Sheet 1
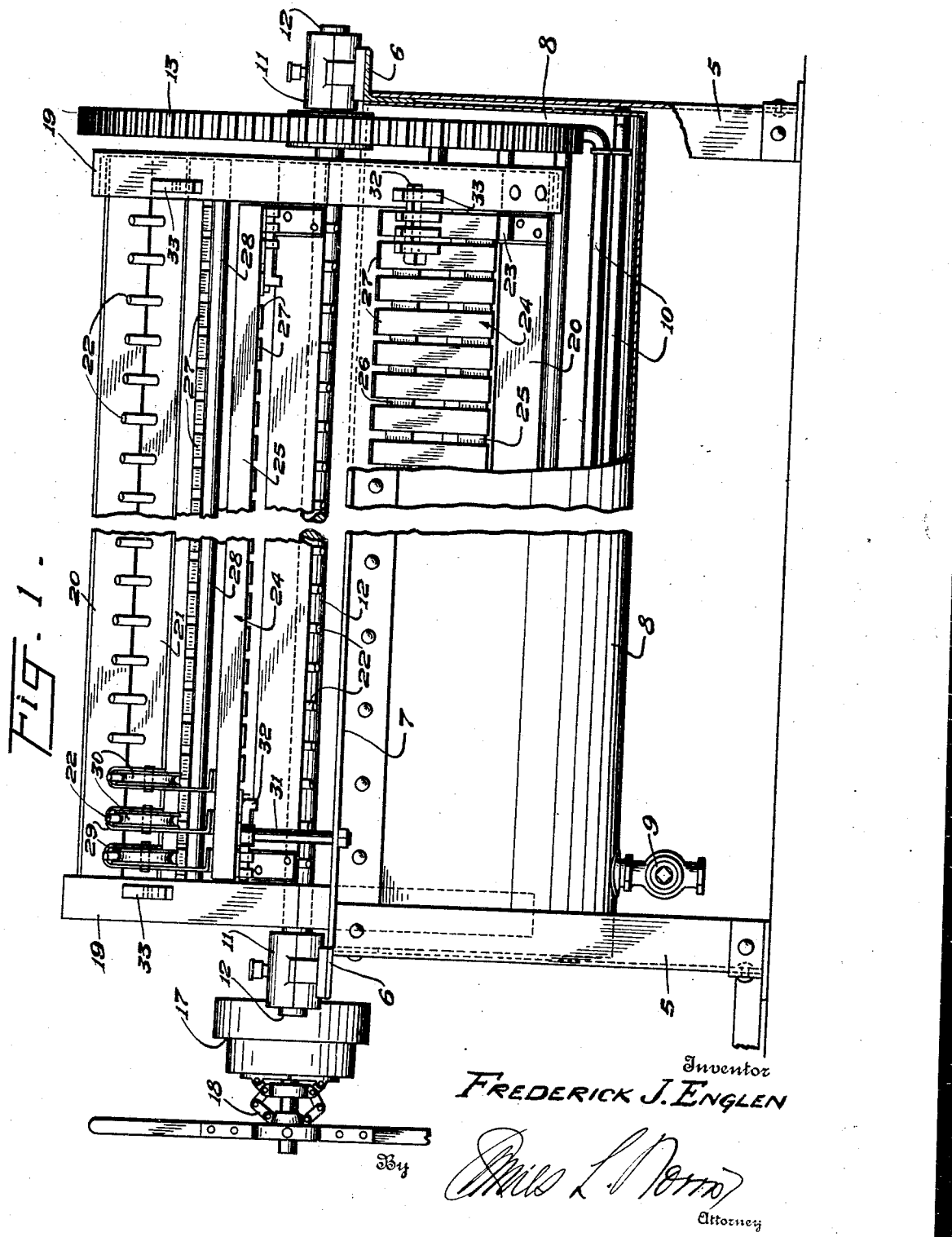
Inventor
FREDERICK J. ENGLEN
By
Attorney Aug. 26, 1930.　　　　　F. J ENGLEN　　　　　1,774,362
MACHINE FOR WASHING MEAT TROLLEYS
Filed June 28, 1928　　　3 Sheets-Sheet 2
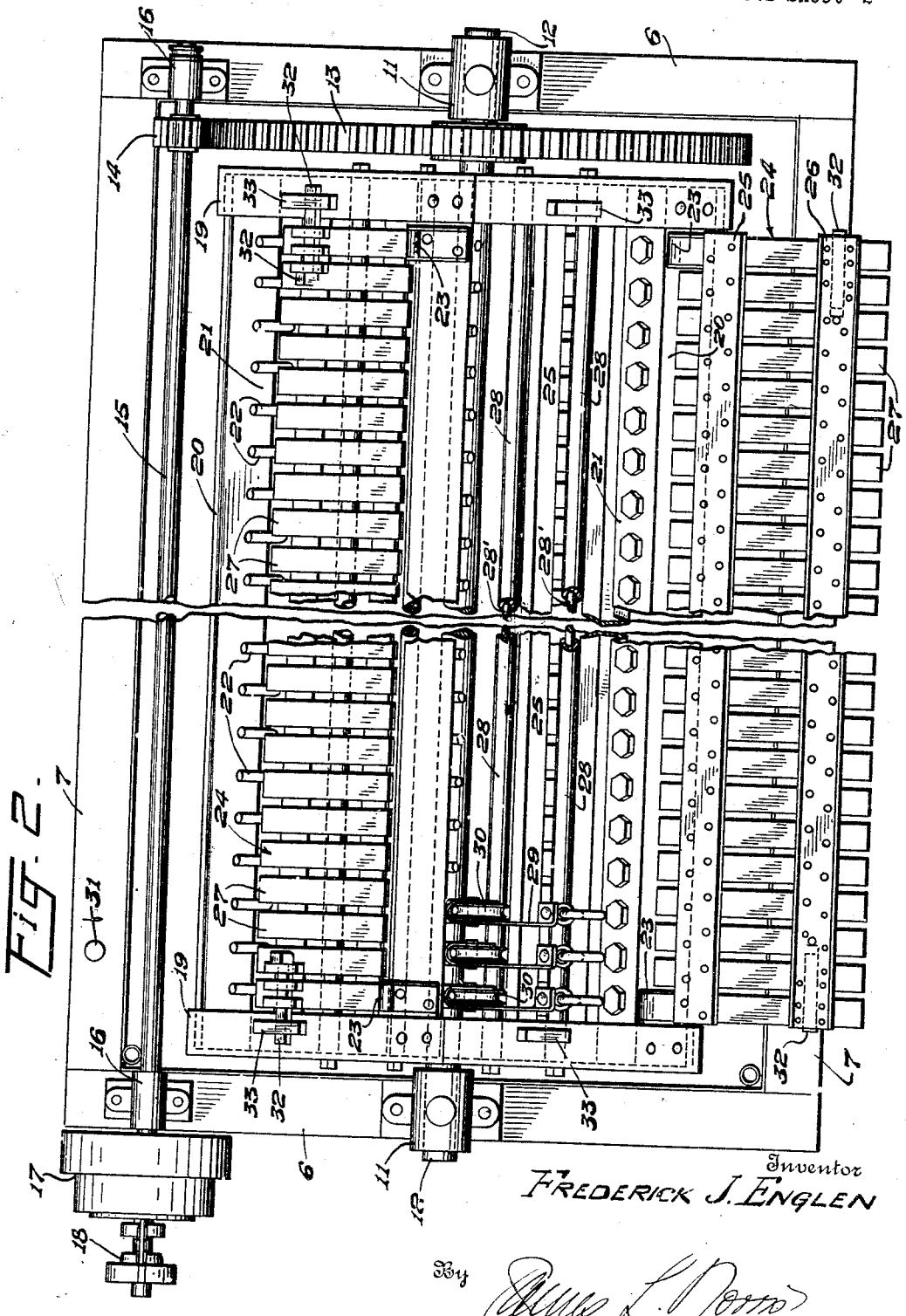

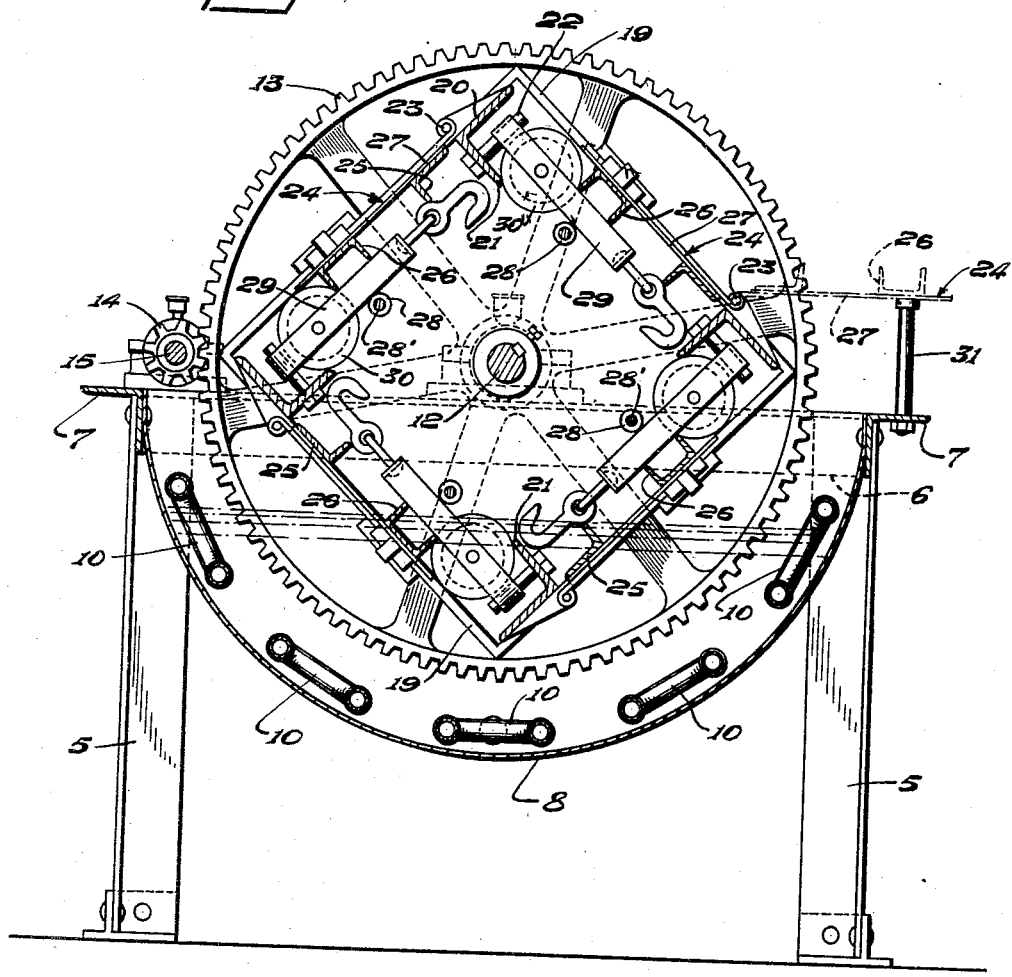

Patented Aug. 26, 1930

1,774,362

UNITED STATES PATENT OFFICE

FREDERICK J. ENGLEN, OF OMAHA, NEBRASKA

MACHINE FOR WASHING MEAT TROLLEYS

Application filed June 28, 1928. Serial No. 288,978.

This invention relates to improvements in washing machines for meat trolleys, one object of the invention being the provision of a machine by which meat trolleys in wholesale numbers may be washed, and sterilized, in a sanitary manner so as to free them entirely of all fragments of meat, blood and rust that have a tendency to cling thereto when the trolleys are in use in supporting or moving carcasses from place to place and within the refrigerators.

A further object of this invention is the provision of a machine of this character in which a plurality of sets of hangers are provided and carried by a rotary member, said hangers being easily accessible for the placing thereon and the removal therefrom of the trolleys, and the complete device being so mounted as to be readily rotatable with the trolleys in a cleansing bath within a tank.

In the accompanying drawings:—

Figure 1 is a side elevation, partly in section, of the complete apparatus;

Figure 2 is a top plan view thereof with one of the slatted sides or guards in open position; and Figure 3 is a cross-section through the complete device with one of the slatted guards shown in dotted position as opened.

Referring to the drawings, the framework consists of the legs 5, the longitudinal angle irons 7 and the transverse angle irons 6, thus providing an open frame for the proper support of the present apparatus.

A substantially semi-cylindrical tank 8 is supported in the open framework and is adapted to contain the liquid for cleansing the trolleys, the tank being filled from the top and drained through the valve 9 at the bottom thereof, there being disposed throughout and within the tank a plurality of heating coils 10 which are supplied in any desired manner with steam for heating the cleansing liquid.

Carried by the respective angle irons 6 are the journal bearings 11 which support for rotation the shaft 12, and this shaft at one end has fixedly secured thereto the large gear wheel 13 which, in turn, is driven by the small gear 14 carried by the drive shaft 15. This shaft 15 is journaled in the journal boxes 16 and is provided with the fast and loose pulleys 17, the operation of the present device being controlled through the lever-actuated clutch 18 of any desired construction.

The rotary trolley carrying member of the present device comprises two rectangular end members or heads 19, each of which has a rim or flange at the edge thereof turned toward the opposite end of the apparatus, and longitudinal angle irons 20, four in number, each of which has one of its legs connected at its opposite ends to the rims of the end members 19 and has its other leg 21 turned inwardly and supporting a plurality of pins 22 which serve as hangers or carriers for the respective trolleys, as will presently appear. A hinge 23 is connected to the outer face of each of the angle irons 20 adjacent each end thereof, the pair of hinges carried by each angle iron serving to support a guard 24 for that side of the trolley carrying member. Each guard 24 comprises an angle iron 25 and a channel iron 26, and transverse members 27 secured to said angle iron and channel iron, as clearly shown in Figures 1 and 2. These hinged guards 24 only partially close each side of the rotary member, and when the trolleys are mounted on the pins 22 and the guards 24 are in closed position each channel iron 26 will engage the trolleys mounted on the pins 22 at one side of the trolley carrying member, as illustrated in Figure 3, so as to press said trolleys against one of the tubular rods 28, which tubular rods are supported upon the tie-rods 28' extending between the heads 19 so as to cooperate with the angle irons 20 to form a rigid cage. Each of the pins 22 passes between the yoke portion of the frame 29 and adjacent the trolley wheel 30 of one of the trolleys, and each hinged guard is provided at each of its ends with a locking bolt 32 to engage a locking member 33 carried by one of the end members 19 so as to secure such guard in closed position over its associated rows of trolley supporting pins 22 and thus hold the trolleys in position on the pins 22 while the trolley carrying member is rotated to dip the trolleys into the liquid within the tank 8 to cleanse and sterilize the same.

In order to load or unload the present device, the rotating member is positioned as shown in Figure 3. The locking members 32 of one of the guards 24 are then released and the hinged guard 24 is moved to the dotted position to rest upon the support 31 carried by the angle iron 7 so that complete access may be had for the insertion or removal of the respective trolleys which will normally be held in place by the pins 22 the tubular members 28 and until the guard 24 is in closed position and the bolts 32 engage the fixed locking members 33.

From the foregoing description, taken in connection with the drawings, it is evident that inasmuch as the trolley carrying cage is fast to the shaft 12 when the shaft 15 is operated to drive the shaft 12, said cage will be rotated and will dip or submerge successively the various sets or rows of trolleys so as to cause the heated liquid within the tank 8 to completely cover said trolleys, thus removing any sediment and dirt carried thereby, thus providing a thoroughly practical method of cleaning trolleys in great numbers and in a quick and efficient manner.

The revolving action of the trolley carrying member within the tank which contains the heated liquid loosens and removes the accumulation of grease and rust from the trolleys and at the same time the trolleys are sterilized by the heated liquid in the tank.

What is claimed is:—

1. In a washing machine for meat trolleys, the combination of a tank and a rotating trolley carrying member mounted therein, a plurality of spaced trolley hangers carried by said member and arranged in a line parallel with the axis of rotation of the latter and extending outwardly therefrom, and means engaging the frames of the trolleys for limiting the movements of the trolleys during the rotation of the carrying member.

2. In a washing machine for meat trolleys, the combination of a frame, a tank supported thereby, a rotary cage journaled in the frame for rotation within the tank, a plurality of trolley hangers spaced apart and carried by the cage, said hangers being arranged in rows parallel with the axis of rotation of said cage and projecting outwardly therefrom, and means to engage and hold the trolleys on the hangers during rotation of the cage.

3. In a washing machine for meat trolleys, the combination of a frame, a tank supported thereby, a shaft carried by the frame, a rectangular cage carried by the shaft and having an opening in each of its sides, a guard for each of said openings hinged to the cage, and a plurality of spaced trolley hangers in said cage and arranged in rows parallel to said shaft, the hangers of each row being arranged opposite to and extending toward one of said openings.

4. In a washing machine for meat trolleys, the combination of a frame, a tank supported thereby, a shaft carried by the frame, a rectangular cage carried by the shaft, guards carried by the cage, one for each side of the cage, said cage comprising a plurality of angle irons one at each corner thereof, a plurality of trolley-supporting pins carried by each angle iron, means extending lengthwise of the cage, one for each of said angle irons, for limiting the inward movement of the trolleys when supported by the pins, and means carried by each guard to prevent outward displacement of the trolleys when supported upon the pins.

5. In a washing machine for meat trolleys, the combination of a frame, a tank carried by the frame, an openwork cage journaled in the frame for rotation within the tank, a plurality of spaced pins mounted in said cage in rows parallel with the axis of rotation of said cage with their ends directed outwardly from said axis, each of said pins adapted to support one end of a trolley, a plurality of bars extending lengthwise of said cage, each parallel to one of said rows of pins and each adapted to bear against a row of trolleys adjacent the other ends of the latter, and a plurality of guards carried by the cage, one opposite each of said bars and each comprising a pair of members to bear against the trolleys supported by the row of pins opposite thereto on the side opposite the bar.

In testimony whereof I have hereunto set my hand.

FREDERICK J. ENGLEN.